US006443374B1

(12) United States Patent
Astachow et al.

(10) Patent No.: US 6,443,374 B1
(45) Date of Patent: Sep. 3, 2002

(54) NOZZLE BODY FOR A FUEL INJECTION NOZZLE WITH OPTIMIZED INJECTION HOLE DUCT GEOMETRY

(75) Inventors: Andrej Astachow, Rostock; Eberhard Kull, Pfaffenhofen; Andreas Fath; Hakan Yalcin, both of Regensburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/613,035

(22) Filed: Jul. 10, 2000

(30) Foreign Application Priority Data

Jul. 8, 1999 (DE) ........................................ 199 31 890

(51) Int. Cl.$^{7}$ ........................ F02M 59/00; F02M 39/00; B05B 1/30; F16K 31/02

(52) U.S. Cl. ................................ 239/533.2; 239/533.3; 239/585.1; 239/599; 251/129.15

(58) Field of Search ........................... 239/533.2, 533.3, 239/533.7, 533.12, 463, 533.4, 533.5, 585.1, 585.2, 585.4, 585.5, 584, 599; 251/118, 129.15

(56) References Cited

U.S. PATENT DOCUMENTS

| | | | | | |
|---|---|---|---|---|---|
| 4,540,126 | A | * | 9/1985 | Yoneda et al. | 239/533.4 |
| 5,791,986 | A | * | 8/1998 | Matsumura et al. | 451/5 |
| 5,875,973 | A | * | 3/1999 | Filiz et al. | 239/533.2 |
| 5,992,766 | A | * | 11/1999 | Hofman | 239/533.2 |
| 6,105,883 | A | * | 8/2000 | Takeda et al. | 239/463 |
| 6,247,655 | B1 | * | 6/2001 | Filiz et al. | 239/533.2 |

FOREIGN PATENT DOCUMENTS

DE 195 07 171 C1 8/1996

* cited by examiner

*Primary Examiner*—David Scherbel
*Assistant Examiner*—Davis Hwu
(74) *Attorney, Agent, or Firm*—Laurence A. Greenberg; Werner H. Stemer; Gregory L. Mayback

(57) ABSTRACT

In a nozzle body, a degree of rounding of edges of an entry region of an injection hole duct in the nozzle body is dependent on a distribution of a fuel stream around the entry region. The edges being more rounded, the greater the fuel stream at the respective edge portion is. The entry region of the injection hole duct has, in this case, preferably the form of an ellipse.

4 Claims, 1 Drawing Sheet

NOZZLE BODY FOR A FUEL INJECTION NOZZLE WITH OPTIMIZED INJECTION HOLE DUCT GEOMETRY

BACKGROUND OF THE INVENTION

Field of the Invention

The invention relates to a method for the rounding of edges of an injection hole duct in a nozzle body and to a nozzle body for a fuel injection nozzle. Such a method and such a nozzle body are known from German Patent DE 195 07 171 C1.

A fuel injection nozzle is formed of essentially two parts, a nozzle body and a nozzle needle, the nozzle needle being inserted axially moveably in the nozzle body.

The nozzle body is generally configured cylindrically with an inner bore and, at its end located on a combustion space side, has a conically tapering dome region which is closed off by a blind hole. The nozzle needle carries, at its lower end, a sealing cone which, in a state of rest, is pressed onto a conical sealing face in the dome region of the nozzle body. Depending on the type of injection nozzle, at least one injection hole duct leads from the blind hole or the conically tapering dome region of the nozzle body, downstream of the sealing seat, through the nozzle body into the combustion space of an engine. When the moveable nozzle needle is lifted off with its sealing cone from the sealing seat in the nozzle body, the injection hole duct is exposed and fuel is injected in the combustion space.

In the nozzle body illustrated in German Patent DE 195 07 171 C1, the injection hole duct is configured as a rectilinearly continuous bore which is introduced in the nozzle body obliquely to the inner bore according to the desired injection hole cone angle. The result of the oblique orientation of the injection hole duct is that the fuel introduced into the inner bore with very high pressure has to be deflected sharply in order to be injected into the combustion space via the injection hole duct. This leads to a reduction in the fuel velocity and consequently to undesirable throttling of the fuel jet injected into the combustion space and, furthermore, a strength-reducing notch effect.

In order to achieve an improved fuel injection jet characteristic, German Patent DE 195 07 171 C1 proposes to round off, edgeless, the injection hole duct in the entry region at the transition into the sealing seat of the nozzle body, an upper entry region which faces the fuelflow direction having a larger rounding radius than a lower entry region which faces away from the flow direction. Despite the rounding off of the entry region, the fuel stream continues to be subjected, at the transition from the inner bore of the nozzle body into the injection hole duct, to a sharp deflection which markedly reduces the throughflow coefficient of the fuel stream and thus leads to injected fuel suffering flow-around and velocity losses. Furthermore, the limited throughflow coefficient of the fuel stream in the injection hole duct also restricts the throughflow quantity and therefore the volume injected into the combustion space of the engine.

SUMMARY OF THE INVENTION

It is accordingly an object of the invention to provide a nozzle body for a fuel injection nozzle with an optimized injection hole duct geometry that overcome the above-mentioned disadvantages of the prior art methods and devices of this general type, which ensure an improved injection jet characteristic.

With the foregoing and other objects in view there is provided, in accordance with the invention, a shape forming method, which includes, first providing a fuel injection nozzle having a nozzle shank with an inner bore formed therein and with a conically tapering dome region. The dome region has an injection hole duct formed therein and the injection hole duct is formed laterally into the dome region. The injection hole duct has an entry region being funnel-shaped with differently rounded-off edges. Second, there is the step of forming a degree of rounding of the edges of the entry region of the injection hole duct in dependence on a distribution of a fuel stream around the entry region. An edge portion of the entry region being more rounded a greater the fuel stream is at the edge portion.

In accordance with an added feature of the invention there are the steps of determining the distribution of the fuel stream around the entry region of the injection hole duct by a simulation calculation; and carrying out the degree of rounding of the edges of the entry region on a basis of the simulation calculation.

In accordance with an additional feature of the invention, there is the step of carrying out the degree of rounding of the edges of the entry region of the injection hole duct by hydroerosive grinding.

According to the invention, the edges at an injection hole duct in a nozzle body are rounded in such a way that the degree of rounding of the edges of the entry region is coordinated with the distribution of the fuel stream around the entry region. The edge portions being the more rounded, the greater the fuel stream at these edge portions is.

By this optimization of the entry region of the injection hole duct, the deflection angle, which results from the alignment of an inner bore and a seat cone in the nozzle body and a desired injection angle in a combustion space of an engine, is reduced to a minimum. As a consequence of which the throughflow coefficient of the fuelflow and therefore the velocity of the fuel injected out of the injection hole duct into the combustion space can be increased. Moreover, by the reduced deflection angle, turbulences in the fuel are also reduced as far as possible, so that the injection jet acquires an optimized flow profile.

According to the invention, the entry region of the injection hole duct in the nozzle body has essentially the form of an ellipse. A major axis of the ellipse coinciding with a direction of the fuelflow through the inner bore of the nozzle body, and the edges of the entry region being more rounded in a vertex region of the major axis of the ellipse than in the vertex region of a minor axis of the ellipse. This embodiment of the entry region of the injection hole in the nozzle body ensures an optimized fuel deflection, with the result that undesirable turbulences in the injected fuel and throttling of the flow velocity are prevented.

With the foregoing and other objects in view there is further provided, in accordance with the invention, a nozzle body for a fuel injection nozzle, which includes a nozzle shank having an inner bore formed therein and a dome region with at least one injection hole duct formed therein. The dome region has an entry region leading into and defining an entry of the at least one injection hole duct. The entry region has differently rounded-off edges and the injection hole duct being a substantially ellipse shaped injection hole duct with a minor axis and a major axis coinciding with a direction of fuel flow through the inner bore of the nozzle shank. The edges of the entry region being more rounded in a vertex region of the major axis of the ellipse shaped injection hole duct than in a vertex region of the minor axis of the ellipse shaped injection hole duct.

In accordance with an added feature of the invention, the entry region has a form of a degenerate ellipse. An edge in the vertex region of the major axis of the degenerate ellipse facing the inner bore of the nozzle shank is more rounded than an edge in the vertex region of the major axis facing away from the inner bore of the nozzle shank.

In accordance with another feature of the invention, the edges of the entry region are rounded in a range of 10 $\mu$m to 70 $\mu$m.

In accordance with a concomitant feature of the invention, the entry region includes a first entry region part, a second entry region part and a third entry region part. A degree of rounding of the edges of the entry region, as a percentage, is defined as follows:

rounding of the first entry region part=[D×(30 to 40)]/S×100;

rounding of the second entry region part=[D×(10 to 20)]/S×100; and rounding of the third entry region part=[D×25]/S×100;

where D corresponds to a hydraulic throughflow through the nozzle body after a rounding and S to a number of injection holes.

Other features which are considered as characteristic for the invention are set forth in the appended claims.

Although the invention is illustrated and described herein as embodied in a nozzle body for a fuel injection nozzle with an optimized injection hole duct geometry, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
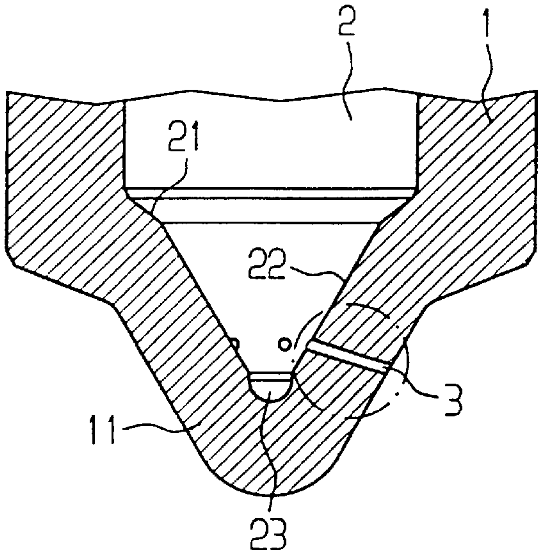
FIG. 1 is a diagrammatic, sectional view of a dome region of a nozzle body according to the invention.

In all the figures of the drawing, sub-features and integral parts that correspond to one another bear the same reference symbol in each case. Referring now to the figures of the drawing in detail and first, particularly, to FIG. 1 thereof, there is shown a part of a nozzle body for a fuel injection nozzle which is essential to the invention. The nozzle body has a nozzle shank 1 closed off by a conically tapering dome region 11 which is rounded off at its tip and which extends in a combustion space of an engine. Formed in the nozzle shank 1 is an essentially cylindrical inner bore 2 which, in the conically tapering dome region 11 of the nozzle shank 1, merges via a shoulder edge 21 into a likewise conically tapering seat cone 22. The seat cone 22 terminates in a blind hole 23 at a tip of the dome region 11 of the nozzle shank 1.

A non-illustrated nozzle needle, which carries a sealing cone at its tip, can be disposed axially moveably in the inner bore 2 of the nozzle shank 1 in the conventional way. With the injection nozzle closed, a sealing cone of the nozzle needle sits on the seat cone 22 in the dome region 11 of the nozzle shank 1, so that no fuel passes out of the inner bore 2 into the region of the nozzle shank 1 of the seat cone 22. With the fuel injection nozzle open, the nozzle needle is lifted off with its sealing cone from the seat cone 22 and fuel can flow out of the inner bore 2 into the dome region 11 of the nozzle shank 1.

In order to inject fuel into the combustion space of the engine, an injection hole duct 3 is formed in the dome region 11 of the nozzle shank 1, downstream of the intended linear contact between the sealing cone of the nozzle needle and the seat cone 22 in the nozzle shank 1. With the injection nozzle open, the fuel fed into the inner bore 2 of the nozzle shank 1 is discharged under pressure, via the injection hole duct 3, into the combustion space of the engine.

In general, as shown in FIG. 1, a plurality of the injection hole ducts 3 are distributed around the dome region 11 of the nozzle shank 1, in order to achieve fuel injection with a defined injection hole cone angle, depending on the shape of the combustion space. In the case of a central vertical installation of the nozzle shank 1, the injection hole ducts 3 are distributed preferably symmetrically at the same elevation angle around the dome region 11 of the nozzle shank 1. By contrast, in the case of an oblique nozzle shank 1, the injection hole ducts 3 are introduced into the dome region 11 of the nozzle shank 1 at different elevation angles, but preferably with the same azimuth angle, in order to achieve the desired injection hole cone angle. FIG. 1 shows a nozzle body for a standard fuel injection nozzle, in which the injection hole cone angle, at which the fuel is injected tangentially out of the injection hole duct 3 into the combustion space, is approximately 150°. Since the angle of the seat cone 22 in the dome region 11 of the nozzle shank 1 is approximately 60°, during injection the fuel stream has to be deflected through approximately 105°.

Simulation calculations or model tests on fuel injection nozzles also showed that the fuel-flows differently into the injection hole duct 3. It was found that, depending on the shape of the nozzle body, the configuration of the injection hole duct 3 and an injection pressure, a distribution of the fuel stream in the injection hole duct 3 is established, in which 30–40% of the fuel enters the injection hole duct 3 from above from the direction of the inner bore 2 of the nozzle shank 1, 10–20% from below from the direction of the blind hole 23 and, in each case, approximately 25% from the side.

Figure 2:
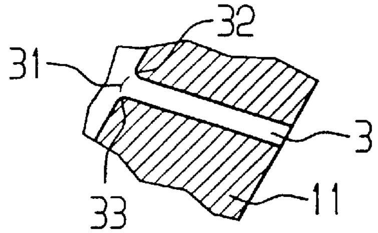
FIG. 2 is an enlarged fragmented, sectional view of the dome region with an injection hole duct shown in FIG. 1.

In order to achieve a smooth deflection of the fuel stream out of the inner bore 2 in the nozzle shank 1 into the injection hole duct 3, the injection hole duct 3 is rounded off, edgeless, in an entry region 31, as shown by the view of a detail in FIG. 2. The degree of rounding of the edges of the entry region 31 being coordinated with the distribution of the fuel stream around the entry region. In this case, the edge portions of the entry region 31 of the injection hole duct 3 are the more rounded, the greater the fuel stream at the respective edge portion is.

Figure 3:
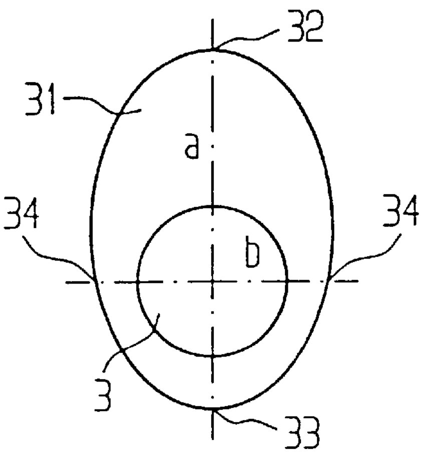
FIG. 3 is a top plan view of an entry region of the injection hole duct.

Taking into account the distribution of the fuel stream around the injection hole duct 3, found from the simulation calculations or model tests, an essentially elliptical entry region 31 is arrived at for an optimized inflow of fuel into the injection hole duct 3 in the case of a nozzle body for a standard fuel injection nozzle. The major axis a of the ellipse coinciding with the direction of the fuelflow through the inner bore 2 of the nozzle shank 1, and, due to the higher mass flow, the edges of the entry region 31 being more rounded in a vertex region 32, 33 of the major axis a of the ellipse than a vertex region 34 of a minor axis b of the ellipse. On account of the higher mass flow of fuel from the direction of the inner bore 2, as compared with the fuel stream from below from the direction of the blind hole 23, the entry region 31 is configured preferably as a degenerate ellipse, as shown in FIG. 3. An edge in the vertex region 32 of the major axis a of the ellipse which faces the inner bore 2 of the nozzle shank 1 being more rounded than the edge in that vertex region 33 of the major axis a of the ellipse which is oriented toward the blind hole 23 in the dome region 11 of the nozzle shank 1. The entry edges are rounded with a rounding radius preferably in a range of 10 μm to 70 μm, and the degree of rounding, as a percentage, may be defined as follows:

Rounding of the vertex region 32=[D×(30 to 40)]/S×100;

Rounding of the vertex region 33=[D×(10 to 20)]/S×100;

Rounding of the vertex region 34=[D×25]/S×100;

D=$cm^3$/30 sec measured at a pressure of 100 bar.

D corresponds, here, to a hydraulic through-flow through the nozzle body downstream of the rounding and S to a number of injection holes.

The ratio of the rounding radii to one another corresponds preferably to the ratio of the throughflows D in the regions of the rounding radii to one another.

A rounding radius R1 in the vertex region 32, a rounding radius R2 in the vertex region 33 and a rounding radius R3 in the vertex region 34 are in the same ratio to one another as the throughflows D in the corresponding vertex regions 32, 33, 34.

By the entry region 31 of the injection hole duct 3 being rounded according to the invention as a function of the distribution of the fuel stream around the entry region 31, the deflection angle of the fuel jet at the transition into the injection hole duct 3 is reduced and, furthermore, the risk of turbulences in the entry region 31 is diminished, so that an improved combustion profile is established. At the same time, the concept according to the invention can be implemented not only in the injection hole nozzle form illustrated in FIG. 1, but also in the other known nozzle forms in which the injection hole duct may also be disposed, for example, in the blind hole.

The injection hole duct 3 in the dome region 11 of the nozzle shank 1 is generally introduced into the dome region 11 by use of the bore. So as then to round off the entry region 31 of the injection hole duct 1, remachining is carried out by hydroerosive grinding. In this case, a medium containing abrasive particles flows through the inner bore 2 in the nozzle shank 1 and the injection hole duct 3, in order to strip off material from the edges of the entry region 31 of the injection hole duct 3 and thus round off the entry edges. At the same time, according to the invention, the hydroerosive grinding is controlled in such a way as to produce an entry region in which the degree of rounding of the edges is coordinated with the distribution of the fuel stream around the entry region of the injection hole duct 3, determined by simulation calculations or tests.

We claim:

1. A nozzle body for a fuel injection nozzle, comprising:

a nozzle shank having an inner bore formed therein and a dome region with at least one injection hole duct formed therein, said dome region having an entry region leading into and defining an entry of said at least one injection hole duct, said entry region having differently rounded-off edges, said injection hole duct being a substantially ellipse shaped injection hole duct with a minor axis and a major axis coinciding with a direction of fuel flow through said inner bore of said nozzle shank, and said edges of said entry region being more rounded in a vertex region of said major axis of said ellipse shaped injection hole duct than in a vertex region of said minor axis of said ellipse shaped injection hole duct.

2. The nozzle body according to claim 1, wherein said entry region has a form of a degenerate ellipse, an edge in said vertex region of said major axis of said degenerate ellipse facing said inner bore of said nozzle shank being more rounded than an edge in said vertex region of said major axis facing away from said inner bore of said nozzle shank.

3. The nozzle body according to claim 1, wherein said edges of said entry region are rounded in a range of 10 μm to 70 μm.

4. The nozzle body according to claim 1, wherein said entry region includes a first entry region part, a second entry region part and a third entry region part, a degree of rounding of said edges of said entry region, as a percentage, is defined as follows:

rounding of said first entry region part=[D×(30 to 40)]/S×100;

rounding of said second entry region part=[D×(10 to 20)]/S×100; and rounding of said third entry region part=[D×25]/S×100;

where D corresponds to a hydraulic throughflow through the nozzle body after a rounding and S to a number of injection holes.

* * * * *